INVENTOR
Albert G. Keldenich

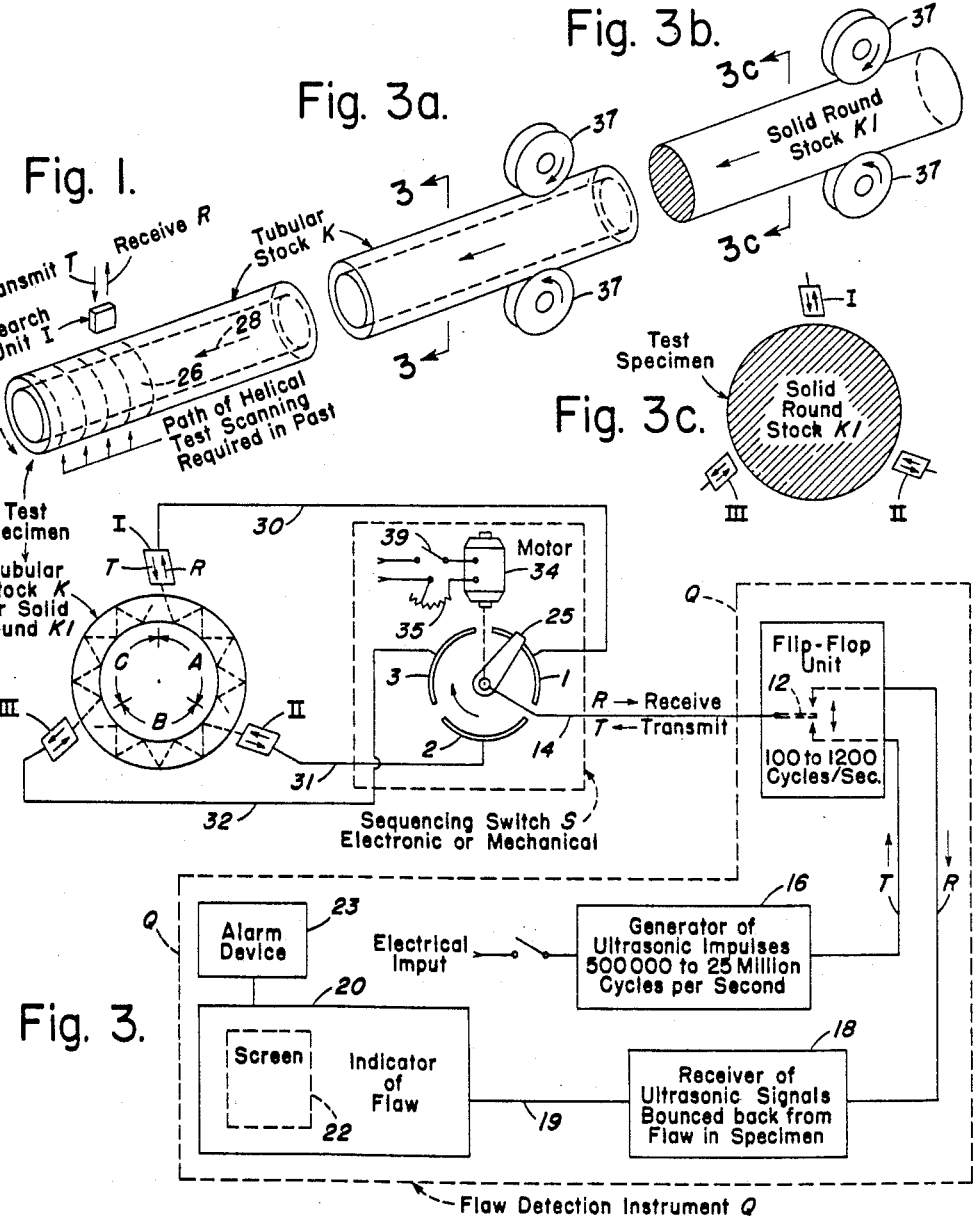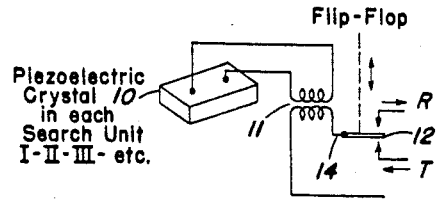

United States Patent Office 3,228,233
Patented Jan. 11, 1966

3,228,233
INCREASING THE SPEED AND THOROUGHNESS AND ECONOMY OF ULTRASONIC AND OTHER NON-DESTRUCTIVE TESTING OF MATERIALS FOR DETECTING FLAWS OR VARIANCES THEREIN
Albert G. Keldenich, Hammond, Ind., assignor to Combustion Engineering, Inc., Windsor, Conn., a corporation of Delaware
Filed Oct. 4, 1962, Ser. No. 228,306
2 Claims. (Cl. 73—67.8)

My invention relates to the non-destructive testing of bodies and shapes such as pipes and tubing, bar stock of round or square or flat or other cross section, as well as other shapes of various configurations and types; and it has special reference to such non-destructive testing of the mentioned bodies and shapes when same are formed of metal or of other material into and through specimens of which there can be transmitted and conducted significant quantities of a medium such as sonic vibrations or the like by which flaws and variations in the specimen material can be detected and identified.

A broad or general object of my invention is to increase the speed and to better the thoroughness of the non-destructive testing referred to immediately above.

A more specific object is to simplify and otherwise improve the methods and the apparatus for accomplishing this non-destructive testing so that it can be carried out in a manner more superior and more practical than has been possible heretofore.

Another important object is to boost by the order of from seven to fourteen times the speed with which such non-destructive testing can be performed by sonic-vibration apparatus, or by test equipment using other principle, on tubing that is either round or multi-sided and also on solid bar stock having round or multi-sided or other configuration.

A further significant object is to eliminate the previous need and requirement that the tube or bar specimen be physically rotated during the non-destructive testing thereof by the sonic-vibration method, thereby removing to a major extent the limitations which such prior rotation of the specimen have rather rigidly imposed in the top testing speed that is safely permissible.

An additional object is to open the way for attaining a higher degree of thoroughness and reliability in the non-destructive testing of material specimens by the sonic-vibration and allied techniques here under discussion.

A still further object is to lower the cost of non-destructive testing installations by uniquely utilizing a single flaw-detecting instrument, of an electronic type costing several thousand dollars each, to serve and respond to a plurality of individual search units rather than to only one as has been typical in the past.

The invention will now be described, by way of illustrative example, in reference to the accomypanying drawings wherein:

FIG. 1 is a simplified perspective showing of round tubular stock being tested by the ultrasonic pulse echo technique as organized and practiced prior to the present invention;

FIG. 2 illustrates a piezoelectric crystal element such as the single search unit I of the FIG. 1 system conventionally incorporated for both transmitting and receiving ultrasonic test pulses;

Figures 4, 4A:
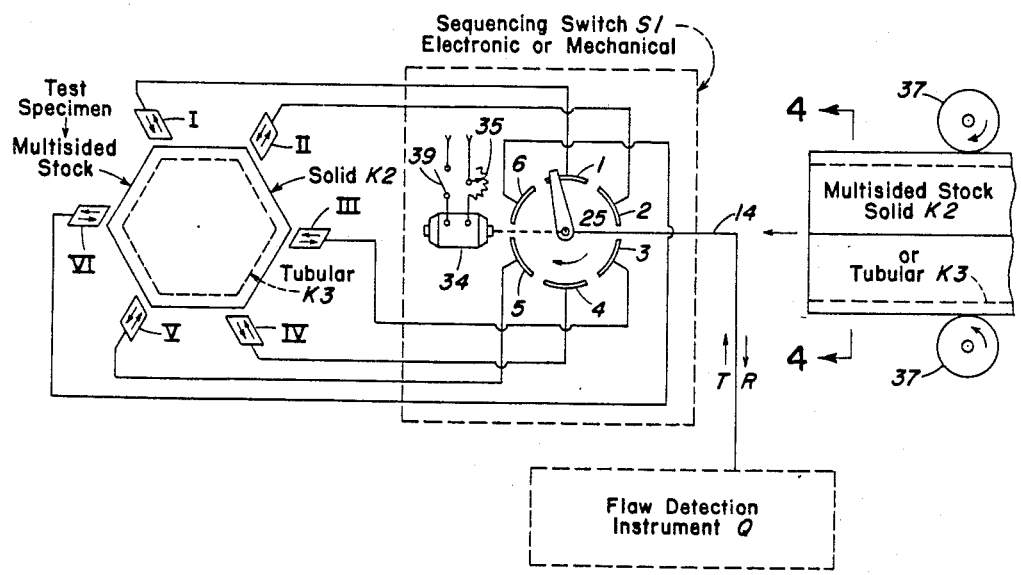
Figures 5, 5A:
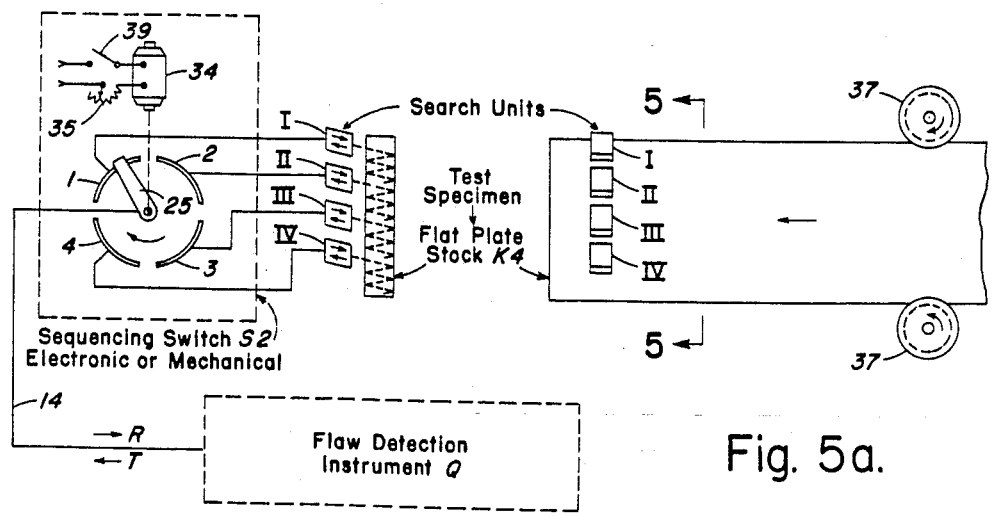

FIGS. 3 and 3a show my invention applied to the non-destructive testing of tubular stock by the ultrasonic principle of FIG. 1 when same is improved as per my invention to utilize a plurality of search units and also to incorporate new sequence switching means uniquely organized in a way that permits a single flaw-detecting instrument effectively to respond to each and every one of the search units so utilized;

FIGS. 3b and 3c indicate how my improved testing method and apparatus of FIGS. 3–3a likewise can be applied for ultrasonically testing a specimen of solid round stock;

FIGS. 4 and 4a show my invention utilized to improve the ultrasonic testing of multi-sided specimens of either the solid or the tubular variety; and FIGS. 5 and 5a similarly indicate how my invention can be applied for improving the ultrasonic testing of flats or sheets or plate stock.

As the description hereof proceeds, it will become apparent that my inventive improvements are capable of benefiting non-destructive testing systems not only of the ultrasonic type here illustrated but also of certain other generally similar systems such as those of the magnetic-particle or the dye-penetrant or the eddy-current types.

*Sonic-vibration testing of tubes as practiced prior to this invention*

Referring now to the drawings, FIGS. 1 and 2 diagram the generally accepted method by which tubes K of metal or other material presently are tested for the presence of flaws by what commonly is known as the "ultrasonic" technique. In such ultrasonic inspection, high frequency sound is produced by a piezoelectric crystal which FIG. 2 indicates at 10 and which forms part of the single search unit shown at I in FIG. 1.

The sound waves so produced are used to obtain information about the interior of test specimen K by studying the echoes which are reflected from inside the specimen material; and it is possible to judge distances by the length of time required to receive an echo from an obstruction, as is well known to those skilled in this art. Penetration by such sound waves is possible into most non-porous materials used for structural purposes, such as steel, aluminum, titanium, magnesium and ceramics or plastics. For further detailed explanation of ultrasonic test principles reference may be had to Section 43 of volume II of a "Non-destructive Testing Handbook," edited by Robert C. McMaster and published in 1959 by The Ronald Press Company in New York.

The mentioned crystal 10 of search unit I is electrically pulsed via suitable circuits which FIGS. 2 and 3 diagram in a form that is highly simplified in order to facilitate explanation. In those drawing views the mentioned pulsing or electrical excitation is applied to the crystal through transformer 11 and flip-flop element 12 from a flaw-detecting instrument of any suitable form such as FIG. 3 represents at Q. In FIG. 3 all diagraming is on a single-line basis, again to make explanation easier.

When electrically pulsed, this crystal 10 vibrates at its own natural frequency; such frequency becoming progressively higher as the crystal is made physically thinner. In systems of the type here considered, the frequency will be in the range of from 500,000 to 25 million cycles per second. The sound waves involved are exceedingly short, all being well above the top limit of the 20,000 cycles per second that is audible to the human ear. Such short waves are known as "ultrasound" or "ultrasonic."

For a particular application, choice of the crystal frequency is in part determined by the material of the specimen K to be tested, and in remaining part by how the crystal vibrations are transmitted from the search unit I into the specimen material. Transmission methods commonly used include the "contact" and the "immersed" and the "flowing water" or "bubbler" and the "wheel" or "rolling probe," all of which are so well known that detailed description is not necessary here.

Assuming use of the "rolling probe" method for testing a tube K that is formed of steel, the crystal-vibration frequency can satisfactorily be chosen within the range of from about 2 million to about 10 million cycles per second. Expressed in another way, the frequency range just stated will be from 2 megacycles to 10 megacycles.

Again referring to the drawings hereof, the flip-flop element shown at 12 in FIGS. 2 and 3 is representative of electronic apparatus which forms part of the flaw detection instrument Q and which is both standard and well known. Such electronic "flip-flop" apparatus has here been represented in the form of mechanical contact 12 in order more easily to make clear how the represented system operates. In an actual commercial installation the "flip-flop" function will be performed electronically, rather than by the mechanical means that are shown at 12 in the drawings hereof.

In the simplified showing by FIGS. 2 and 3, the aforementioned contact 12 will be assumed to be driven at a frequency within the general range of from about 100 to about 1200 cycles per second. It then serves to connect conductor 14 alternately with two cooperating conductors represented at T and R. Each connection with "transmit" conductor T causes the pulse generator 16 of instrument Q to excite the crystal 10, causing it to vibrate at its natural frequency for about two millionths of a second. The result is a very short burst of sound waves which travel from the search unit I of FIG. 1 through the usual coupling liquid (not shown) to the surface of test specimen K.

A portion of the sound is immediately reflected from the near surface of the specimen as a very large echo. Part of the sound will not be reflected and will continue into the specimen material. If this portion of the sound encounters interference in the form of a break in the material, it will be reflected from the discontinuity or flaw and will return as a separate echo following the front-surface echo.

After the crystal 10 in search unit I has given off its short burst of sound waves, it stops vibrating and "listens" for the returning echoes. Such listening occurs each time that flip-flop element 12 engages with "receive" conductor R. This cycle of transmitting and then receiving is repeated at the earlier mentioned adjustable rate of from about 100 to about 1200 times per second. The flaw detection instrument Q contains a synchronizer, working in conjunction with the flip-flop element 12, which accurately times the spacing of the pulses sent out over conductor T from generator 16 (whose output has been adjusted to match the natural frequency of crystal 10), and also provides the receiver 18 with a time sense.

When the echoes are received by search unit I, they cause the crystal 10 therein to vibrate and to generate an electric current which is carried by conductor R back to the receiver 18. Here such received current is amplified and then sent on via conductor 19 to a suitable flaw indicator shown at 20 in FIG. 3. Such indicator may include a cathode ray tube for displaying each flaw indication on a screen 22, in well-known manner. If desired, the flaw indicator 20 also may be supplemented by some suitable alarm device 23.

*Prior art limitations which stimulated my making of the present invention*

For coordinating the "prior art" description given immediately above with the diagrams of FIGS. 1–2–3, it can be assumed that in FIG. 3 a switch contact 25 (later to be described) rests stationarily on segment 1, thereby connecting the flaw detecting instrument Q with and only with the crystal search unit I. Under this condition, the system of FIG. 3 typifies what has in the past been available for the ultrasonic testing of tubes K and other specimens to determine the presence of flaws therein.

Using a search unit that has one or even two of the crystals 10 at only the single location I of FIGS. 1 and 3, a tubular test specimen such as K had to be rotated while also being advanced longitudinally. This resulted in the helical path of test scanning which is shown at 26 in FIG. 1; the rotative and longitudinal movements which produce same being respectively indicated by the arrows 27 and 28.

Such helical scanning was necessary in order to provide 100% inspection coverage of the specimen material. But by it there were imposed rather severe limitations in the speed with which a tubular or other specimen could be inspected. In the case of a tubular specimen K, such limitations were the result of two factors.

The first is the speed at which the tube K can safely be rotated during the testing operation. This varies with the tube diameter and wall thickness, as well as with the tube length and straightness and rigidity. Experience shows that the safe limit of tube rotation usually does not go above about 300 r.p.m. and may be substantially lower in certain instances, as affected by what is stated above. A correspondingly undesirable limit thus is placed upon the rate at which the tube being tested can be lineally advanced past the single search unit I; and the speed of productive testing is thus severely held down by the rotation factor just described.

A second related factor which also limits the attainable testing speed comes into play when either the "contact" or the "immersion" methods are used for transmitting the sonic vibrations from the crystal search unit I into the tubular specimen K. In the conventional helical pattern of test scanning, there is a limitation in the surface inches of the specimen which can satisfactorily be passed beneath the crystal search unit.

Speaking of the "contact" method, Nuclear specifications of Navy origin now say that such speed must not go above approximately six inches per second or thirty peripheral feet per minute; for if that speed is substantially exceeded the liquid couplant between the search unit I and the tubular specimen K will break down and interfere with transmission of sound into the specimen material. For a tube K of two-inch outside diameter, this means that the top rotative speed cannot go above about 55 r.p.m.

Other boiler tube applications of less critical nature generally permit use of 80 peripheral feet per minute. Again for a tube K of two-inch outside diameter, the rotation can go only as high as about 155 r.p.m. Using a crystal search unit I of one-inch dimension along the tube length and with a feed of ⅞ inch per tube revolution, the tube K length which can be tested by the FIG. 1 technique will on this basis be about 11.3 lineal feet per minute.

*The sonic test system improvements added by the present invention*

In order to eliminate the need for rotating the tubular specimen K and thereby permit such tube to advance lengthwise through the ultrasonic testing apparatus without rotating, other workers in this field already have suggested supplementing the single search unit I by two or more added search units placed around the tube periphery as shown at II and III in FIG. 3.

Such multiple crystal units I–II–III previously have been connected in parallel to the flaw detection instrument Q by which single instrument all have been excited simultaneously and to which single instrument the several sets of return signals have all simultaneously been sent. With such an arrangement, however, it is found that the ratio of "noise level" to the defect signal becomes undesirably increased due to all crystals contributing to such noise level while only one is detecting the defect. Thus the defect signal tends to become obscured in the exaggerated total noise level which appears as "hash" on the cathode-ray-tube screen 22 of FIG. 3; and for this vital reason the past parallel connection of multiple search units to a single flaw detection instrument Q does not operate satisfactorily in practice.

It is of course true that the above objection can be overcome by providing each of the multiple search units I–II–III, etc. with its own separate and individual flaw detection instrument Q. This however is not economically feasible because of the fact that each such instrument Q represents a financial outlay of several thousand dollars. Moreover, adjustment of the several individual instruments Q to the test installation set-up also is time consuming and otherwise difficult. In consequence the multiple-instrument arrangement just described has not been adopted to any great extent.

In accordance with the present invention, all of the objections stated immediately above are overcome by energizing only one of the multiple crystal search units I–II–III, etc., at any given instant, and by making unique provision for transferring such energization from one to another of the several search units in a sequential pattern which repeats itself time after time at a speed that is adjustable for best operating results. In this way the one crystal search unit from among the several which is in position to detect the flaw will have only its own noise level to contend with in distinguishing the flaw response.

Referring now to FIG. 3, the three crystal search units I–II–III are there shown as being positioned around the circumference of the tube specimen K at the equal 120° spacings designated as A and B and C. These multiple search units are respectively connected via conductors 30 and 31 and 32 with corresponding segments 1 and 2 and 3 of a sequencing switch S. The movable blade 25 of that switch is in the illustrative device shown driven by an electric motor 34 the speed of which can be varied by rheostat 35 from a very low value up to 1800 r.p.m. or higher; and the so-rotated blade 25 of switch S is connected via conductor 14 with the flip-flop element 12 earlier described as forming a part of flaw detection instrument Q.

Even though the represented switch S has been shown in the form of a mechanical device, it will be understood that the sequencing function thereof may if desired also be performed electronically. The complete system of FIGS. 3–3a further includes conveying feed rolls 37 by which the tubular specimen K is moved lengthwise, without rotation, past the multiple search units I–II–III that are equally spaced circumferentially therearound. Each of those search units is inclined away from the specimen radius so that the probing sound therefrom enters the specimen surface at an angle indicated in FIG. 3 by the light dotted lines, which angle is in practice adjusted to the value that gives best results.

In operation, this improved ultrasonic testing system of FIGS. 3–3b functions in the advantageous manner set forth below. Each of its three search units I–II–III covers at least 120° of tube K's total 360° circumference, with such three scanning zones being respectively designated as A–B–C. These are identified with search units I–II–III as the light dotted lines of FIG. 3 indicate. Upon closure of switch 39, motor 34 rotates the blade 25 of switch S at some appropriate preselected speed within the general range earlier mentioned; and such rotation causes blade 25 to connect flaw detecting instrument Q with the crystal search units I–II–III individually and sequentially.

While this is happening the flip-flop element 12 of flaw detection instrument Q continues to function in the usual manner. Result is an alternate transmission to and reception from whichever of the crystal search units I–II–III that is sequentially connected by switch S with conductor 14 and element 12. In this way the flaw detection instrument Q is at any given instant transmitting to and receiving from only one of said multiple search units I–II–III; and it thus can respond thereto in customary fashion without noise-level or other interference from the other two multiple search units that are unconnected at said given instant.

In consequence of the foregoing, the tubular specimen K being tested need no longer be rotated but can instead be advanced by the rollers 37 of FIG. 3a lengthwise without rotation past the multiple search units I–II–III. This eliminates the restriction on tube testing speed that has in the past been imposed by the previous requirement for rotation during ultrasonic inspection.

The permissible rate of lineal advancement through the ultrasonic test stand thus is not longer dictated by specimen rotation, and insofar as mechanically handling the specimen is concerned it now can go as high as 300 feet per minute.

The sole restriction presently remaining is the aforementioned limitation in permissible "surface speed" movement by the test specimen past the crystal search units without sacrifice in scanning reliability. In the old set-up of FIG. 1 such "surface speed" was with regard to rate of circumferential movement of the tubular specimen past its single search unit I; this being commonly referred to as "peripheral speed." But with the improve system shown by FIGS. 3–3a hereof, such permissible peripheral speed is now converted into lineal speed on the part of the non-rotating specimen lengthwise past its crystal search units I–II–III.

When the tubular specimen K has the two-inch outside diameter earlier discussed, this means that such two-inch specimen now can advance through the ultrasonic test stands at speeds up to 80 feet per minute, as compared with only 11.3 feet per minute for the same specimen when "rotatively" tested by the old FIG. 1 arrangement. Moreover, the tube diameter no longer has sigdificance with regard to test speed determination since as the diameter increases additional multiple search units may readily be added to cover the increased circumferential span.

Looking next at FIGS. 3b–3c, these show how the tubular specimen K of FIG. 3 can be replaced by a specimen of solid round stock that is shown at K1 in FIG. 3c. Ultrasonic testing of the latter can satisfactorily be accomplished by the FIG. 3 set-up using multiple search units as represented at I–II–III. Only changes needed here will be an adjustment in the angle of entry of the sound from the multiple search units into the solid round specimen K1; also possible provision of more than three such units when the solid round specimen has a large diameter.

This brings us to FIGS. 4–4a wherein the test specimens K2 and K3 have the multi-sided cross section shown. Here use is made of six crystal search units I throug VI respectively disposed around the specimen at the six corners thereof; and the sequencing switch S1 is provided with six corresponding segments 1–2–3–4–5–6 to which said search units 1 through VI respectively are connected.

Such organization is appropriate for multi-sided specimens having either the solid cross section shown at K2 or the tubular cross section shown at K3. In it the rotative contact 25 of switch S1 is via conductor 14 connected with the flaw detecting instrument Q which may have the same internal organization that FIG. 3 shows and that already has been described. Rollers 37 of FIG. 4a advance specimen K2 or K3 lengthwise past the six search units I thru VI while the testing is in progress.

Looking finally at FIGS. 5–5a, the test specimen there represented takes the form of flat plate stock K4. This plate K4 is moved by rollers 37 lengthwise past multiple search units which may be of either greater or lesser number than the four shown at I–II–III–IV. These multiple search units are arranged to span the total width of the plate K4 being tested, with each covering its proportionate share of that width. This is indicated by the light dotted lines of FIG. 5.

The associated sequencing switch S2 has four corresponding segments 1–2–3–4 to which said search units I–II–III–IV respectively are connected; and the rotative blade 25 of this switch is connected via conductor 14 with a single flaw detecting instrument Q duplicating the similarly designated instrument of FIG. 3.

*Same inventive improvements also applicable to non-destructive testing system of other than sonic-vibration type*

All of the discussion thus far presented has been in connection with non-destructive testing systems of the ultrasonic vibration type, and the benefits to these made possible by my invention are believed to have been clearly set forth. Such benefits include increasing the speed and bettering the thoroughness of ultrasonic testing; simplifying and otherwise improving the methods and the apparatus for accomplishing such non-destructive testing by the ultrasonic method; eliminating the previous need and requirement that the tubing or bar specimen be physically rotated during such ultrasonic testing thereof; and lowering the cost of non-destructive test installations by uniquely utilizing a single flaw-detecting instrument to serve and respond to a plurality of individual search units rather than to only one as has been typical in the past.

The same sequential-switching principle here applied to the ultrasonic systems likewise is capable of advantageous use in other generally similar systems such as those of the magnetic-particle or the dye-penetrant or the eddy-current types. It is believed that the utility therein of my inventive improvements will be obvious to those skilled in this non-destructive testing art.

In the case of magnetic-particle and dye-penetrant systems, electric eyes or photosensitive light cells are usable as search units corresponding to I–II–III, etc., in the drawings hereof; and by connecting a plurality of these through a sequencing switch S to appropriate flaw-detecting instrumentation, advantages comparable to those explained for ultrasonic systems can be achieved. And in the case of eddy-current systems, probe coils corresponding to search units I–II–III, etc., can similarly be connected through a sequencing switch S to flaw-detection apparatus there appropriate and usable.

In the light of the foregoing it will be seen that the various embodiments of my invention which are herein disclosed and described are to be construed in an illustrative rather than in a restrictive sense, and that my invention accordingly has the comparatively broad significance which the following claims specify and define.

What I claim is:

1. In apparatus for ultrasonically testing an elongated specimen for the presence of flaws therein, the combination of a plurality of ultrasonic search units peripherally disposed about the external surface of said specimen in spaced relation one to another, each of said search units capable of both transmitting and receiving ultrasonic vibrations, means for moving said specimen lengthwise past said search units, an ultrasonic flaw detection instrument including an ultrasonic generator and an ultrasonic receiver and means to alternately connect said generator and said receiver with said search units, sequence switching means interposed between said instrument and said plurality of search units, said switching means adapted to connect said instrument with each of said search units one at a time in sequential and cyclically repeating order whereby said instrument transmits to and receives from only one of said search units at a time but does so for each of said search units.

2. Apparatus for ultrasonically testing an elongated specimen as defined in claim 1 wherein said ultrasonic search units are disposed at an angle to the surface of said specimen such that the ultrasonic vibrations enter the specimen at an angle to the surface of the specimen adjacent said search unit.

References Cited by the Examiner

UNITED STATES PATENTS

| 2,932,189 | 4/1960 | Carlin | 73—67.7 |
| 3,021,706 | 2/1962 | Cook et al. | 73—67.8 |
| 3,052,115 | 9/1962 | Renaut et al. | 73—67.5 |

FOREIGN PATENTS

| 736,464 | 7/1953 | Great Britain. |
| 865,446 | 4/1961 | Great Britain. |

RICHARD C. QUEISSER, *Primary Examiner.*